United States Patent
Jordan et al.

(10) Patent No.: US 12,139,206 B2
(45) Date of Patent: Nov. 12, 2024

(54) ROTATION LIMITATION MODULE AND STEERING WHEEL MODULE FOR A STEER-BY-WIRE STEERING SYSTEM

(71) Applicant: ZF Automotive Germany GmbH, Alfdorf (DE)

(72) Inventors: Martin Jordan, Düsseldorf (DE); Peter Krones, Recklinghausen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 243 days.

(21) Appl. No.: 17/965,108

(22) Filed: Oct. 13, 2022

(65) Prior Publication Data
US 2023/0109811 A1  Apr. 13, 2023

(30) Foreign Application Priority Data
Oct. 13, 2021  (DE) .......................... 102021211555.1

(51) Int. Cl.
*B62D 5/00* (2006.01)
*B62D 6/10* (2006.01)

(52) U.S. Cl.
CPC .............. *B62D 5/005* (2013.01); *B62D 6/10* (2013.01)

(58) Field of Classification Search
CPC .................................. B62D 5/005; B62D 6/10
See application file for complete search history.

(56) References Cited

U.S. PATENT DOCUMENTS

| | | | | |
|---|---|---|---|---|
| 6,062,336 A * | 5/2000 | Amberkar | ................ | B62D 6/00 180/443 |
| 7,389,849 B2 * | 6/2008 | Williams | ................ | B62D 5/09 180/428 |
| 9,926,004 B2 * | 3/2018 | Blond | ................... | B62D 5/065 |
| 2013/0062138 A1 * | 3/2013 | Naitou | .................. | B62D 5/046 318/400.2 |
| 2013/0299271 A1 * | 11/2013 | Endo | .................... | B62D 5/0487 180/446 |
| 2015/0239498 A1 * | 8/2015 | Cao | ........................ | B62D 5/065 180/422 |

(Continued)

FOREIGN PATENT DOCUMENTS

| | | |
|---|---|---|
| DE | 102018103963 A1 | 8/2018 |
| KR | 19990011100 A | 2/1999 |
| KR | 100351406 B1 | 12/2002 |

*Primary Examiner* — Ramsey Refai
(74) *Attorney, Agent, or Firm* — Kristin L. Murphy

(57) ABSTRACT

Described is a rotation limitation module for a steer-by-wire steering system. Said rotation limitation module comprises a housing in which a shaft portion that is rotatable about a central axis and is able to be rotatably coupled to a steering wheel shaft or is configured as a portion of the steering wheel shaft is received. Furthermore provided is a limiter disk which by way of a sliding guide is coupled in a rotationally fixed and axially displaceable manner to the shaft portion and has an external thread which is driven into an internal thread of the housing. Moreover, the rotation limitation module comprises a first detent ring having a first detent wing, and a second detent ring having a second detent wing, both detent wings for limiting a rotation of the shaft portion being able to cooperate with the limiter disk. A steering wheel module for a steer-by-wire steering system is also disclosed, which comprises such a rotation limitation module.

18 Claims, 2 Drawing Sheets

(56) References Cited

U.S. PATENT DOCUMENTS

| | | | |
|---|---|---|---|
| 2015/0298729 A1* | 10/2015 | Blond | B62D 5/04 180/443 |
| 2018/0229769 A1* | 8/2018 | Mardh | B62D 15/025 |
| 2022/0111892 A1* | 4/2022 | Seiffer | G07C 5/02 |

* cited by examiner

ROTATION LIMITATION MODULE AND STEERING WHEEL MODULE FOR A STEER-BY-WIRE STEERING SYSTEM

CROSS-REFERENCE TO RELATED APPLICATION

This application claims priority to German Priority Application No. 102021211555.1, filed Oct. 13, 2021, the disclosure of which is incorporated herein by reference in its entirety.

TECHNICAL FIELD

The disclosure relates to a rotation limitation module for a steer-by-wire steering system, having a housing in which a shaft portion that is rotatable about a central axis and that is able to be rotatably coupled to a steering wheel shaft or is configured as a portion of the steering wheel shaft is received. Moreover, the disclosure is directed toward a steering wheel module for a steer-by-wire steering system, which comprises a steering wheel, which is fastened to a first end of a steering wheel shaft, and a rotation limitation module of the type mentioned at the outset, the rotation limitation module being provided on a second end of the steering wheel shaft that faces away from the steering wheel.

BACKGROUND

Steering wheel modules and rotation limitation modules of this type are known from the prior art. To some extent, the components of steering wheel modules are collectively also referred to as a hand wheel actuator or as a torque feedback unit. However, these terms usually do not include the steering wheel. As also already suggested by these designations, known steering wheel modules are configured, inter alia, for generating a torque which supplies to the driver mechanical feedback in the form of a restoring moment.

Rotation limitation modules are sometimes also referred to as mechanical torque limiters, this being based on the fact that the introduction of a torque into the steering wheel module is limited as a result of the activation of the steering wheel.

Accordingly, rotation limitation modules are used in steer-by-wire steering systems in order to limit a rotation of the steering wheel in both rotation directions, said steering wheel in such steering systems no longer being mechanically coupled to a steering gear on the axle. It is ensured in this way, for example, that wiring for electrical systems disposed in the steering wheel is not damaged. Rotation limitation modules are usually configured such that they permit a rotation of the steering wheel in both directions by, for example, 540°, thus 1.5 revolutions. Moreover, rotation limitation modules for safety reasons have to be embodied so that they also function in the event of a failure of an electric power supply.

SUMMARY

What is needed is to further improve known rotation limitation modules and steering wheel modules equipped therewith. A rotation limitation module which is of simple and cost-effective construction is to be achieved in particular.

A rotation limitation module of the type mentioned at the outset is disclosed herein, which, in one exemplary arrangement, is equipped with a limiter disk which by way of a sliding guide is coupled in a rotationally fixed and axially displaceable manner to the shaft portion and has an external thread which is driven into an internal thread of the housing. Furthermore, in one exemplary arrangement, a first detent ring is provided having a first detent wing which radially projects from the former and is disposed on a first axial side of the limiter disk in such a manner that said first detent ring for limiting a rotation of the shaft portion in a first rotation direction cooperates with the limiter disk. The first detent ring is coupled in a rotationally fixed and axially fixed manner to the shaft portion. Moreover, the rotation limitation module is equipped with a second detent ring having a second detent wing which radially projects from the former and is disposed on a second axial side, opposite the first axial side, of the limiter disk in such a manner that said second detent ring for limiting a rotation of the shaft portion in a second rotation direction, counter to the first rotation direction, cooperates with the limiter disk. The second detent ring is also coupled in a rotationally fixed and axially fixed manner to the shaft portion. A rotating movement of the shaft portion is converted into a translatory movement of the limiter disk as a result of the interaction between the external thread and the internal thread. The limiter disk here moves along the central axis, i.e. in an axial direction. In this context, it can be determined by way of a pitch of the external thread and of the internal thread which axial movement of the limiter disk results from a predefined rotating movement of the shaft portion. A calculation of a rotation angle by an axial displacement distance is also possible by way of the pitch. A pitch of a thread here is understood to mean the axial distance traveled as a result of one revolution. This corresponds to an axial spacing between two crests of the thread. The pitch of a thread is in some instances also referred to as the lead. Rotation angles of the shaft portion in both rotation directions can thus be limited in a simple and precise manner by way of axial spacings between the limiter disk and the detent wings. If a maximum permissible rotation angle is reached, the limiter disk in a substantially axial manner runs onto the respective detent wing. The maximum rotation angle of the shaft portion here corresponds directly or indirectly to a maximum steering wheel angle.

The rotation limitation module according to the disclosure here comprises only a few components, for example only a few moving components. Furthermore, the coupling of the limiter disk to the shaft portion is performed by way of a sliding guide which can be produced in a simple and cost-effective manner using standard methods and equipment. The same applies to the coupling of the limiter disk to the housing by way of the internal thread and the external thread. The rotation limitation module overall is thus of simple and cost-effective construction. Moreover, the rotation limitation module is extremely compact. This is a result of the detent wings being of comparatively small size. Moreover, the limiter disk is very short in the axial direction. In addition, the rotation limitation module according to the disclosure causes only comparatively little noise during operation. Moreover, the potential noise caused by the rotation of the limiter disk in the thread of the housing is uniform. Noise which a user could perceive as irritating is thus avoided overall. This is true in comparison to known rotation limitation modules in the operation of which a plurality of moving elements have to be successively entrained and numerous mechanical contacts take place before the actual rotation limitation is reached, said mechanical contacts in each case being associated with a noise.

For example, the sliding guide of the rotation limitation module comprises a toothing which runs purely in the axial direction. It is also possible in one exemplary arrangement for the sliding guide to be implemented by bevels provided on the shaft portion.

Provided on the limiter disk can be a first depression, open in the axial direction, for receiving at least one portion of the first detent wing, the first depression in the axial direction being positioned so as to be in alignment with the first detent wing. Alternatively or additionally, provided on the limiter disk can be a second depression, open in the axial direction, for receiving at least one portion of the second detent wing, the second depression in the axial direction being positioned so as to be in alignment with the second detent wing. If the first detent wing and the second detent wing come into contact with the limiter disk for limiting a rotation of the shaft portion, then the detent wings in the axial direction run at least in sections into a respectively arranged depression. This ensures a compact construction of the rotation limitation module.

The depression is embodied as a groove, for example.

The term "depression" here is understood in a broad sense. For example, an intermediate space between two protrusion also represents a depression.

According to one exemplary arrangement, the first depression and/or the second depression along the axial direction are/is constricted toward the respective depression bottom. Such depressions can be produced in a simple and cost-effective manner. Moreover, it is ensured in this way that the associated detent wing for limiting a rotation of the shaft portion reliably runs into the assigned depression.

The first depression and/or the second depression here can have a front portion, which in the direction toward the respectively assigned detent wing lies axially at the front, and a base portion adjacent thereto, the base portion in the radial direction and/or in the circumferential direction being narrower than at least one portion of the respectively assigned first detent wing or second detent wing, respectively. In one exemplary arrangement, the front portion and the base portion here transition in a continuous manner into one another, i.e. without steps and edges. The respective detent wing can thus only be received in the base portion if the depression in this region is widened and/or the entering portion of the detent wing is compressed. In both variants, an approach of the limiter disk to the assigned detent wing is damped. From the point of view of a user of the rotation limitation module, in one exemplary arrangement, a rotation of the steering wheel and of the steering wheel shaft connected thereto is thus limited by a soft detent. The user is thus not taken by surprise by the detent. This is perceived to be comfortable.

It is also possible for the first detent wing and/or the second detent wing to taper in an axial direction pointing in each case toward the limiter disk. The taper thus refers to a radial dimension or a circumferential dimension. The axial introduction of the detent wings into the respectively assigned depression can be simplified in this way. This results in a reliable function of the rotation limitation module.

The first detent wing and/or the second detent wing here can be designed so as to taper overall. Alternatively, also only that portion of the first detent wing and/or of the second detent wing that is configured for cooperating with a respectively assigned depression can be designed so as to taper.

The first detent wing and/or the second detent wing here can have a front portion, which in the direction toward the limiter disk lies axially at the front, and a base portion adjacent thereto, the base portion in the radial direction and/or in the circumferential direction being wider than at least one portion of the respectively assigned first depression or second depression, respectively. The front portion and the base portion here can transition into one another continuously or by way of an edge or step. By virtue of the dimensions mentioned, the base portion of the first detent wing and/or the base portion of the second detent wing can be received in the respectively assigned depression only if the base portion is compressed and/or the respective depression is widened. A damping effect again results therefrom. From the point of view of a user of the rotation limitation module, a rotation of the steering wheel and of the steering wheel shaft connected thereto is thus limited by a soft detent. The user is thus not taken by surprise by the detent, this most typically being perceived to be comfortable.

Provided on the limiter disk in an alternative design is a first axial protrusion that faces the first detent wing, the first axial protrusion in the axial direction being positioned so as to be in alignment with the first detent wing. Alternatively or additionally, provided on the limiter disk can be a second axial protrusion that faces the second detent wing, the second axial protrusion in the axial direction being positioned so as to be in alignment with the second detent wing. A precise axial detent between the limiter disk and the respectively assigned detent wing can be generated in this way. A rotation of the shaft portion can thus be limited with high accuracy and reliability.

According to one exemplary arrangement, provided on the first detent wing is a first depression, open in the axial direction, for receiving at least one portion of the first axial protrusion and/or provided on the second detent wing is a second depression, open in the axial direction, for receiving at least one portion of the second axial protrusion. This here is the kinematic reversal of those variants in which the depressions are provided on the limiter disk and an assigned detent wing is in each case received in one of the depressions. A simple and compact construction of the rotation limitation module is also achieved with the present variant.

The depression can be embodied as a groove.

The term "depression" is again understood in a broad sense. An intermediate space between two protrusions also represents a depression.

The first depression and/or the second depression here along the axial direction can be constricted toward the depression bottom. Such depressions can be produced in a simple and cost-effective manner. Moreover, it is ensured in this way that the associated detent wing for limiting a rotation of the shaft portion reliably runs into the assigned depression.

An alternative moreover provides that the first depression and/or the second depression have/has a front portion, which in the direction toward the limiter disk lies axially at the front, and a base portion adjacent thereto, the base portion in the radial direction and/or in the circumferential direction being narrower than at least one portion of the respectively assigned first axial protrusion or second axial protrusion, respectively. In this exemplary arrangement, the front portion and the base portion transition continuously into one another, i.e. without steps and edges. The respective axial protrusion can thus be received in the assigned base portion only if the depression in this region is widened and/or the entering portion of the axial protrusion is compressed. In both variants, an approach of the limiter disk to the assigned detent wing is damped. From the point of view of a user of the rotation limitation module, a rotation of the steering wheel and of the steering wheel shaft connected thereto is thus limited by a soft detent. Therefore, the user is not taken by surprise by the detent. This is perceived to be comfortable.

The first axial protrusion and/or the second axial protrusion can also taper in an axial direction pointing toward the respectively assigned detent wing. The taper thus relates to a radial dimension and/or a circumferential dimension which decrease/decreases in each case along the axial direction. The axial introduction of the axial protrusion into the respectively assigned depression can be simplified in this way. This results in a reliable function of the rotation limitation module.

The first axial protrusion and/or the second axial protrusion can be designed so as to taper overall. Alternatively, also only that portion of the first axial protrusion and/or of the second axial protrusion that is configured for cooperating with a respectively assigned depression can be designed so as to taper.

The first axial protrusion and/or the second axial protrusion here can have a front portion, which in the direction toward the respectively assigned detent wing lies at the front, and a base portion adjacent thereto, the base portion in the radial direction and/or in the circumferential direction being wider than at least one portion of the respectively assigned first depression or second depression, respectively. The front portion and the base portion here can transition into one another continuously or by way of an edge or step. By virtue of the dimensions mentioned, the base portion of the first detent wing and/or of the second detent wing can be received in the respectively assigned depression only if the base portion is compressed and/or the respective depression is widened. As already explained, this results in a damping effect. From the point of view of a user of the rotation limitation module, a rotation of the steering wheel and of the steering wheel shaft connected thereto is thus limited by a soft detent. The user is thus not taken by surprise by the detent, this being comfortable for him/her.

In one exemplary arrangement, the first detent ring with the first detent wing and/or the second detent ring with the second detent wing are/is configured so as to be integral with the shaft portion. The rotation limitation module can thus be produced in a comparatively simple manner because in particular operations for assembling the first detent ring and/or the second detent ring on the shaft portion are dispensed with.

In one variant, the first detent wing and/or the second detent wing are/is elastically resilient. In this way, a damping effect results if the first detent wing and/or the second detent wing come into contact with the limiter disk. From the point of view of a user, an assigned detent is comparatively soft, with the result that the user is not taken by surprise by a limitation of the rotation of the steering wheel and of the steering wheel shaft coupled thereto.

A steering wheel module of the type mentioned at the outset is also disclosed, which comprises a rotation limitation module according to the disclosure. By virtue of the fact that the rotation limitation module is of simple and compact construction, the steering wheel module overall is also of simple and compact construction. Moreover, a steering wheel module of this type can be operated while emitting comparatively little noise.

Furthermore, the effects and advantages discussed in the context of the rotation limitation module according to the disclosure also apply to the steering wheel module according to the disclosure.

BRIEF DESCRIPTION OF DRAWINGS

The disclosure will be explained hereunder by various exemplary arrangements that are shown in the appended drawings, in which.

DETAILED DESCRIPTION

Figure 1:
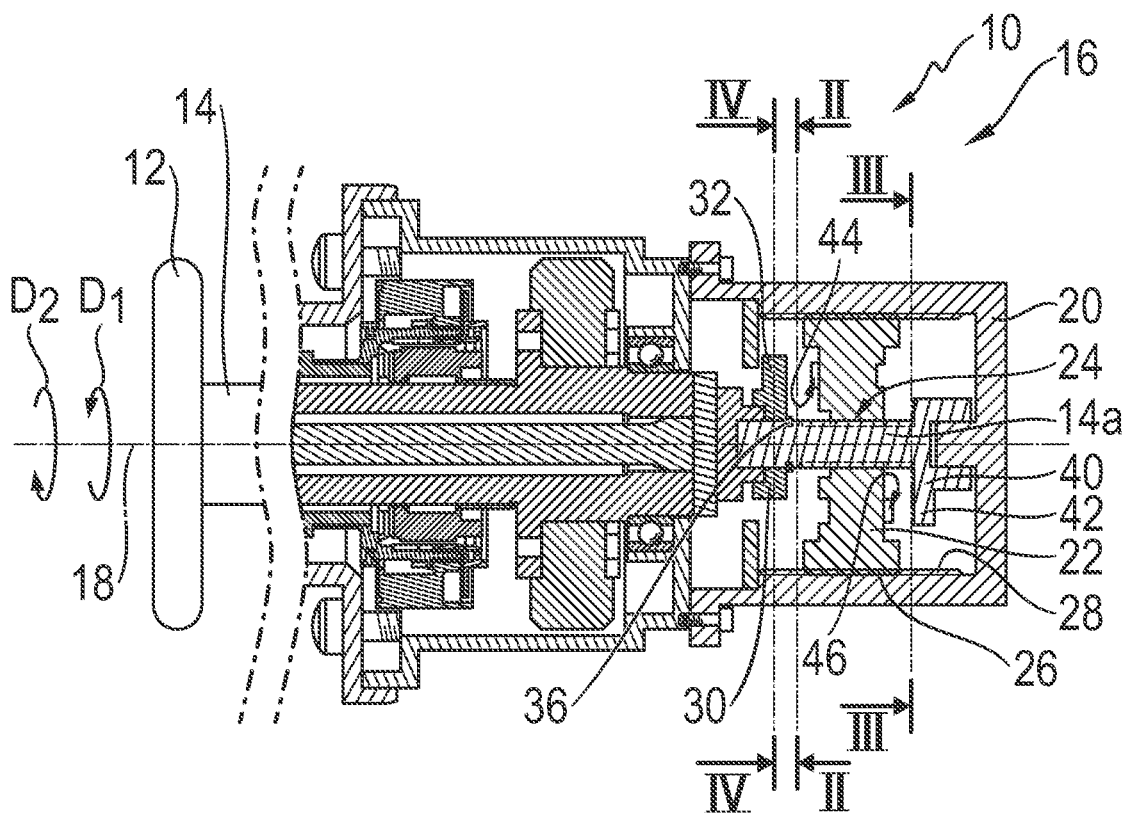
FIG. 1 shows a steering wheel module according to the disclosure, having a rotation limitation module according to the disclosure, in a longitudinal sectional illustration.

FIG. 1 shows a steering wheel module 10 for a steer-by-wire steering system.

The steering wheel module 10 comprises a steering wheel 12 which is only schematically illustrated and is fastened to a first end of a steering wheel shaft 14, and a rotation limitation module 16 which is provided on a second end of the steering wheel shaft 14 that faces away from the steering wheel 12.

The steering wheel 12, conjointly with the steering wheel shaft 14, is rotatable about a central axis 18.

The task of the rotation limitation module 16 lies in limiting a rotation of the steering wheel 12 and of the steering wheel shaft 14 connected to the former in both directions, i.e. in a first rotation direction D1 and a second rotation direction D2.

To this end, the rotation limitation module 16 has a housing 20 in which a shaft portion 14a that is coupled in a rotationally fixed manner to the steering wheel shaft 14 is received.

Furthermore provided is a limiter disk 22.

The latter is rotatably coupled to the shaft portion 14a by way of a sliding guide 24. The limiter disk 22 can thus be displaced along the central axis 18 in relation to the shaft portion 14a, but cannot be rotated in relation to the shaft portion 14a.

Figures 2, 3:
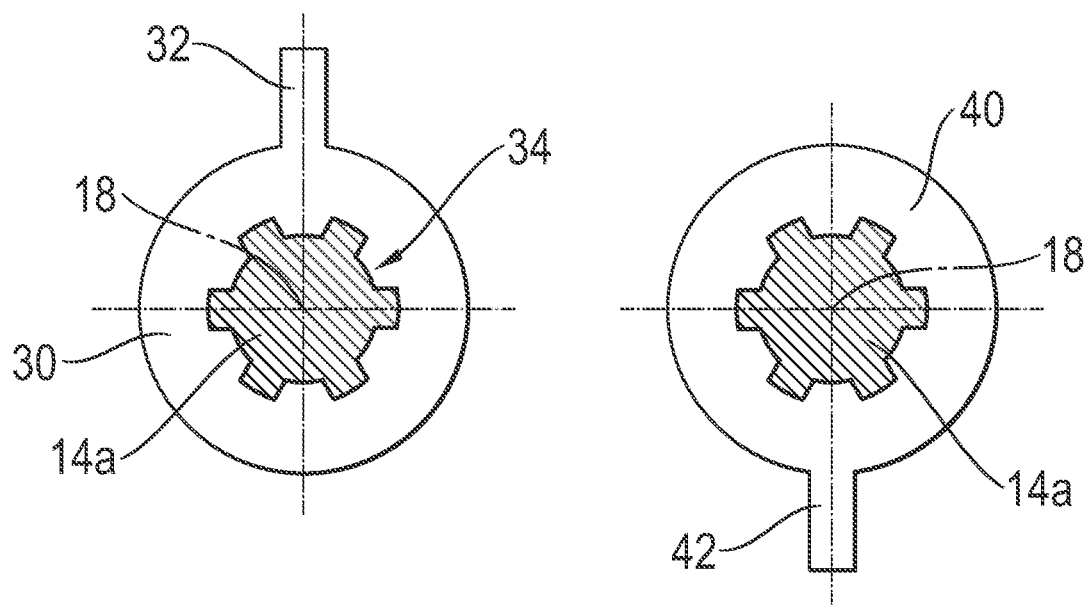
FIG. 2 shows a sectional view along the plane II-II in FIG. 1, wherein a housing of the rotation limitation module is not illustrated.
FIG. 3 shows a sectional view along the plane in FIG. 1, wherein a housing of the rotation limitation module is not illustrated.
Figure 4:
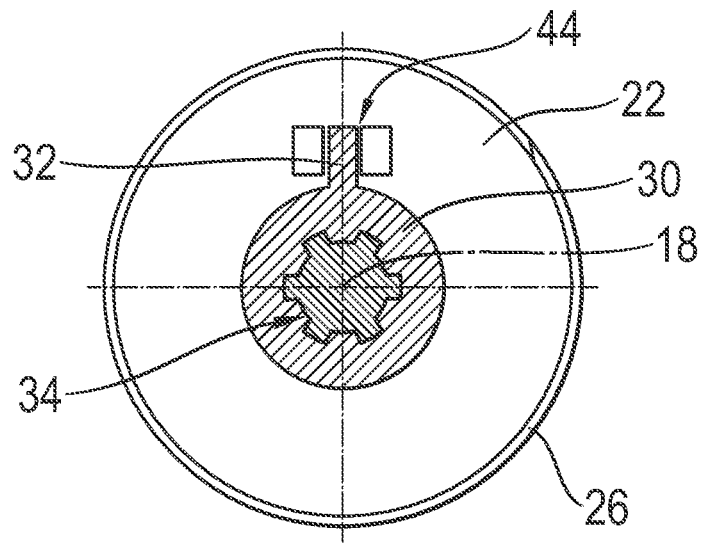
FIG. 4 shows a sectional view along the plane IV-IV in FIG. 1, wherein a housing of the rotation limitation module is not illustrated, and FIG. 5 to FIG. 8 schematically show alternative designs of limiter disks and of detent wings interacting with the former, in partially sectional radial views.

In the exemplary arrangement illustrated, the sliding guide 24 comprises an axial toothing which is configured in a manner analogous to the axial toothing 34 illustrated in FIG. 2.

The limiter disk 22 on the external circumference thereof moreover has an external thread 26 which is driven into an internal thread 28 provided on an internal circumference of the housing 20.

Both the external thread 26 and the internal thread 28 run completely in a circumferential manner.

Furthermore, the internal thread 28 extends substantially across the entire axial length of the housing 20.

The external thread 26 and the internal thread 28 in the exemplary arrangement illustrated are metric threads of the size M60, for example.

If the shaft portion 14a is rotated by virtue of an activation of the steering wheel 12, the limiter disk 22 is thus repositioned in the axial direction.

A first detent ring 30, which has a radially projecting first detent wing 32, is provided on a first axial side of the limiter disk 22 so as to limit a rotation in a first rotation direction D1.

The first detent ring 30 by way of an axial toothing 34 is coupled in a rotationally fixed manner to the shaft portion 14a (see FIG. 2 for example).

Moreover, the detent ring 30 by operation of a circlip 36 is mounted so as to be axially fixed on the shaft portion 14a.

The detent wing 32 here, for limiting a rotation of the shaft portion 14a in the first rotation direction D1, is configured for cooperating with the limiter disk 22. This means that in the case of a rotation of the shaft portion 14a in the first rotation direction D1, which results in a sufficient repositioning of the limiter disk 22 in the axial direction, the limiter disk 22 and the detent wing 32 come into mutual contact and thus prevent any further rotation.

A second detent ring 40, which has a radially projecting second detent wing 42, is provided on a second axial side of the limiter disk 22 that is opposite the first axial side.

As opposed to the first detent ring 30 having the first detent wing 32, the second detent ring 40 having the second detent wing 42 here is configured so as to be integral with the shaft portion 14a.

Consequently, the second detent ring 40 is also coupled in an axially fixed and rotationally fixed manner to the shaft portion 14a.

The second detent wing 42 here, for limiting a rotation of the shaft portion 14a in the second rotation direction D2, is configured for cooperating with the limiter disk 22. In the case of a rotation of the shaft portion 14a in the second rotation direction D2, which causes a sufficient axial repositioning of the limiter disk 22, the limiter disk 22 thus comes into contact with the detent wing 42.

Figure 5:
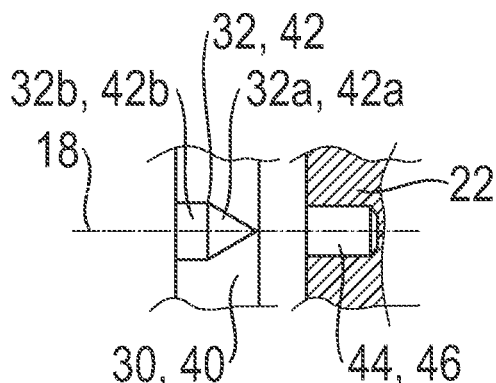

Both the first detent wing 32 and the second detent wing 42 here are configured such that said detent wings 32, 42 taper in each case in an axial direction pointing toward the limiter disk 22 (see FIG. 5).

In the exemplary arrangement illustrated, a circumferential dimension of the two detent wings 32, 42 thus decreases in each case along the axial direction and in each case toward the limiter disk 22.

In this context, the detent wings 32, 42 each have a front portion 32a, 42a, which in the direction toward the limiter disk 22 lies axially at the front, and a base portion 32b, 42b adjacent thereto in each case. The base portions 32b, 42b in the circumferential direction here have a substantially constant dimension. Said base portions 32b, 42b thus do not taper.

Provided on the limiter disk 22 is moreover a first depression 44 for receiving at least one portion of the first detent wing 32, which first depression 44 is open in the axial direction and faces the first detent wing 32.

The first depression 44 in the axial direction is positioned so as to be in alignment with the first detent wing 32.

Provided on an axial side of the limiter disk 22 that faces the second detent wing 42 is a second depression 46, open in the axial direction, for receiving at least one portion of the second detent wing 42.

The second depression 46 here in the axial direction is positioned so as to be in alignment with the second detent wing 42.

The dimensions of the depressions 44, 46 and of the detent wings 32, 42 in the circumferential direction are mutually adapted such that the base portions 32b, 42b in the circumferential direction are wider than the respectively assigned depressions 44, 46.

The depressions 44, 46 in the radial direction are larger than the respectively assigned detent wings 32, 42.

In the example illustrated, the depressions 44, 46 are embodied having a constant width in the circumferential direction and a constant height in the radial direction.

Furthermore, both the first detent wing 32 and the second detent wing 42 are designed so as to be elastically resilient. For example, the first detent wing 32 and the second detent wing 42 are produced from a spring steel material or from a plastics material.

Those regions of the limiter disk 22 in which the depressions 44, 46 are arranged are also provided with a certain elastic resilience. To this end, the limiter disk 22 can be produced from a plastics material.

If the shaft portion 14a is thus rotated in the first rotation direction D1, the front portion 32a of the first detent wing 32 is initially received in the depression 44. If the shaft portion 14a is further rotated in the first rotation direction D1, at least part of the base portion 32b is also received in the depression 44. To this end, the depression 44 is elastically widened and the detent wing 32 is elastically compressed.

A soft, damped detent by way of which a rotation of the steering wheel 12 in the first rotation direction D1 is limited results in this way.

The same applies to the limitation of a rotation in the second rotation direction D2.

If the shaft portion 14a is thus rotated in the second rotation direction D2, the front portion 42a of the second detent wing 42 is initially received in the depression 46. If the shaft portion 14a is further rotated in the second rotation direction D2, at least part of the base portion 42b is also received in the depression 46. To this end, the depression 46 is elastically widened and the detent wing 42 is elastically compressed.

A soft, damped detent by way of which a rotation of the steering wheel 12 in the second rotation direction D2 is limited likewise results.

Figure 6:
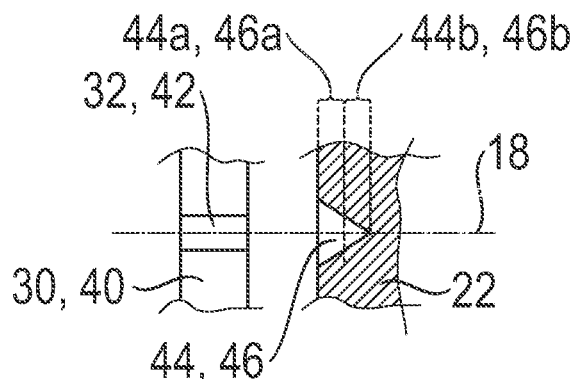

The rotation limitation module 16 can also be configured according to an exemplary arrangement illustrated in FIG. 6. Only the points of differentiation in comparison to the exemplary arrangement explained in the context of FIGS. 1 to 5 will be discussed hereunder. Identical or mutually equivalent components have the same reference signs.

In the exemplary arrangement according to FIG. 6, the first detent wing 32 and the second detent wing 42 have substantially a constant dimension in the circumferential direction. The same applies to the radial direction.

However, the depressions 44, 46 now are constricted along the axial direction toward the respective depression bottom, i.e. away from the respectively assigned detent wing 32, 42.

Both the first depression 44 and the second depression 46 have a front portion 44a, 46a, which in the direction toward the respectively assigned detent wing 32, 42 lies axially at the front. Adjacent thereto in the direction of a respective depression bottom are in each case base portions 44b, 46b.

The base portions here in the circumferential direction are in each case narrower than the respectively assigned detent wings 32, 42.

The depressions 44, 46 in the radial direction are again larger than the respectively assigned detent wings 32, 42.

For limiting a rotation in the first and second rotation direction D1, D2, the detent wings 32, 42 can thus be received in the respective depression 44, 46 only by elastically widening the base portions 44b, 46b as well as by elastically compressing the detent wings 32, 42. As already explained, this results in a soft, damped detent.

The rotation limitation module 16 can also be designed so as to be kinematically reversed. This will be explained with reference to FIGS. 7 and 8. Again, only the points of differentiation in comparison to the exemplary arrangements already described will be discussed here.

Provided on the limiter disk 22 in this context is a first axial protrusion 48 which faces the first detent wing 32 and moreover in the axial direction is positioned so as to be in alignment with the first detent wing 32.

Furthermore, provided on the limiter disk 22 is a second axial protrusion 50 which faces the second detent wing 42 and in the axial direction is positioned so as to be in alignment with the second detent wing 42.

The first axial protrusion 48 and the second axial protrusion 50 are thus positioned on mutually opposite axial sides of the limiter disk 22.

Now provided on the first detent wing 32 is a first depression 33 which is open in the axial direction and is configured for receiving at least one portion of the first axial protrusion 48.

Provided in a corresponding manner on the second detent wing 42 is a second depression 43 which is open in the axial direction and is configured for receiving at least one portion of the second axial protrusion 50.

Figure 7:
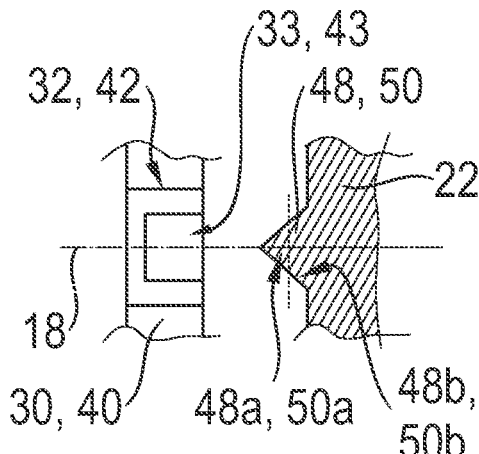

In a first exemplary arrangement, which is illustrated in FIG. 7, the depressions 33, 43 here are embodied having a circumferentially constant width and a constant radial height.

However, when viewed in the radial direction, the first axial protrusion 48 and the second axial protrusion 50 in the axial direction taper in each case in the direction of the respectively assigned detent wing 32, 42.

In this context, the first axial protrusion 48 has a front portion 48a, which lies axially at the front, and a base portion 48b adjacent thereto.

Accordingly, the second axial protrusion 50 has a front portion 50a, which lies axially at the front, and a base portion 50b adjacent thereto.

The dimensions in the circumferential direction here are again mutually adapted such that the base portions 48b, 50b in the circumferential direction are in each case wider than the assigned depressions 33, 43.

The depressions 33, 43 in the radial direction are larger than the respectively assigned axial protrusions 48, 50.

Accordingly, the damping effects already explained also result in this exemplary arrangement.

Figure 8:
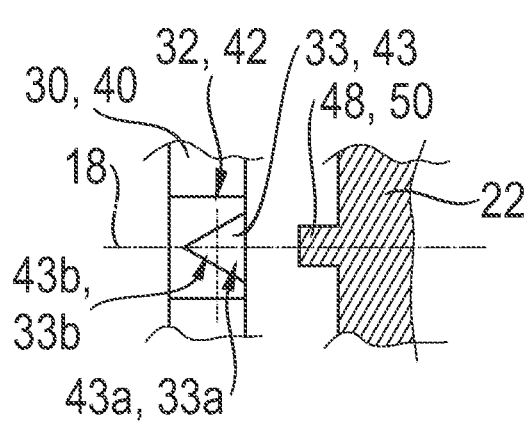

In the exemplary arrangement illustrated in FIG. 8, the axial protrusions 48, 50 are constructed having a circumferentially constant width. A radial height is also constant.

However, the first depression 33 and the second depression 43 now are constricted in each case toward the depression bottom. The constriction direction thus also runs away from the assigned axial protrusion 48, 50.

Accordingly, the first depression 33 has a front portion 33a, which in the direction toward the limiter disk 22 lies axially at the front, and a base portion 33b adjacent thereto.

In the same way, the second depression 43 has a front portion 43a, which in the direction toward the limiter disk lies axially at the front, and a base portion 43b adjacent thereto.

The dimensions in the circumferential direction here are mutually adapted such that the base portions 33b, 43b in the circumferential direction are narrower than the respectively assigned axial protrusions 48, 50.

The depressions 33, 43 in the radial direction are wider than the axial protrusions 48, 50.

The damping effects already explained result again.

The detent wings 32, 42 in the preceding exemplary arrangements are configured so as to be elastically resilient.

The limiter disk 22, in those regions in which the depressions 44, 46 or the axial protrusions 48, 50 are provided depending on the exemplary arrangement, is also provided with a certain elastic resilience.

It is however understood that the effects described can also be achieved if only the detent wings 32, 42 are elastically deformable and, in contrast, the limiter disk 22 is rigid.

The same applies if the detent wings 32, 42 are substantially rigid and only the limiter disk 22, in those regions in which the depressions 44, 46 or the axial protrusions 48, 50 are provided, is elastically resilient.

It is furthermore understood that the aforementioned exemplary arrangements can be combined in an arbitrary manner.

The invention claimed is:

1. A rotation limitation module for a steer-by-wire steering system, comprising:
a housing in which a shaft portion that is rotatable about a central axis and that is able to be rotatably coupled to a steering wheel shaft or is configured as a portion of the steering wheel shaft is received, and
a limiter disk which by way of a sliding guide is coupled in a rotationally fixed and axially displaceable manner to the shaft portion and has an external thread which is driven into an internal thread of the housing,
a first detent ring having a first detent wing which radially projects from the former and is disposed on a first axial side of the limiter disk in such a manner that said first detent ring for limiting a rotation of the shaft portion in a first rotation direction cooperates with the limiter disk, the first detent ring being coupled in a rotationally fixed and axially fixed manner to the shaft portion, and
a second detent ring having a second detent wing which radially projects from the former and is disposed on a second axial side, opposite the first axial side, of the limiter disk in such a manner that said second detent ring for limiting a rotation of the shaft portion in a second rotation direction, counter to the first rotation direction, cooperates with the limiter disk, the second detent ring being coupled in a rotationally fixed and axially fixed manner to the shaft portion.

2. The rotation limitation module as claimed in claim 1, wherein provided on the limiter disk is a first depression, open in an axial direction, for receiving at least one portion of the first detent wing, the first depression in the axial direction being positioned so as to be in alignment with the first detent wing.

3. The rotation limitation module as claimed in claim 2, wherein the first depression along the axial direction is constricted toward the depression bottom.

4. The rotation limitation module as claimed in claim 3, wherein the first depression has a front portion, which in a direction toward the first detent wing lies axially at a front, and a base portion adjacent thereto, the base portion in a radial direction and/or in a circumferential direction being narrower than at least one portion of the respectively assigned first detent wing.

5. The rotation limitation module as claimed in claim 1, wherein the first detent wing taper/tapers in an axial direction pointing toward the limiter disk.

6. The rotation limitation module as claimed in claim 5, wherein the first detent wing have/has a front portion, which in a direction toward the limiter disk lies axially at the front, and a base portion adjacent thereto, the base portion in the radial direction and/or in the circumferential direction being wider than at least one portion of the respectively assigned first depression.

7. The rotation limitation module as claimed in claim 1, wherein provided on the limiter disk is a first axial protrusion that faces the first detent wing, the first axial protrusion in the axial direction being positioned so as to be in alignment with the first detent wing, and/or provided on the limiter disk is a second axial protrusion that faces the second detent wing, the second axial protrusion in the axial direction being positioned so as to be in alignment with the second detent wing.

8. The rotation limitation module as claimed in claim 7, wherein provided on the first detent wing is a first depression, open in the axial direction, for receiving at least one portion of the first axial protrusion, and/or provided on the second detent wing is a second depression, open in the axial direction, for receiving at least one portion of the second axial protrusion.

9. The rotation limitation module as claimed in claim 8, wherein the first depression and/or the second depression along the axial direction are/is constricted toward the depression bottom.

10. The rotation limitation module as claimed in claim 9, wherein the first depression and/or the second depression have/has a front portion, which in a direction toward the limiter disk lies axially at the front, and a base portion adjacent thereto, the base portion in the radial direction and/or in the circumferential direction being narrower than at least one portion of the respectively assigned first axial protrusion or second axial protrusion, respectively.

11. The rotation limitation module as claimed in claim 10, wherein the first axial protrusion and/or the second axial protrusion taper/tapers in an axial direction pointing toward the respectively assigned detent wing.

12. The rotation limitation module as claimed in claim 11, wherein the first axial protrusion and/or the second axial protrusion have/has a front portion, which in the direction toward the respectively assigned detent wing lies axially at the front, and a base portion adjacent thereto, the base portion in the radial direction and/or in the circumferential direction being wider than at least one portion of the respectively assigned first depression or second depression, respectively.

13. The rotation limitation module as claimed in claim 10, wherein the first detent ring with the first detent wing and/or the second detent ring with the second detent wing are/is configured so as to be integral with the shaft portion.

14. The rotation limitation module as claimed in claim 13, wherein the first detent wing and/or the second detent wing are/is elastically resilient.

15. A steering wheel module for a steer-by-wire steering system, having a steering wheel, which is fastened to a first end of a steering wheel shaft, and a rotation limitation module as claimed in claim 1, the rotation limitation module being provided on a second end of the steering wheel shaft that faces away from the steering wheel.

16. The rotation limitation module as claimed in claim 2, wherein provided on the limiter disk is a second depression, open in the axial direction, for receiving at least one portion of the second detent wing, the second depression in the axial direction being positioned so as to be in alignment with the second detent wing.

17. The rotation limitation module as claimed in claim 16, wherein the second depression along the axial direction is constricted toward the depression bottom.

18. The rotation limitation module as claimed in claim 12, wherein the first detent ring with the first detent wing and/or the second detent ring with the second detent wing are/is configured so as to be integral with the shaft portion.

* * * * *